United States Patent
Forssell et al.

(10) Patent No.: US 9,456,397 B2
(45) Date of Patent: Sep. 27, 2016

(54) DYNAMICALLY EXTENDING MOBILE COVERAGE AND CAPACITY BY OFFLOADING

(75) Inventors: Mika Forssell, Söderkulla (FI); Cristian Alexandru, The Hague (NL); Petri Lang, The Hague (NL)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 77 days.

(21) Appl. No.: 14/348,240

(22) PCT Filed: Sep. 29, 2011

(86) PCT No.: PCT/EP2011/066971
§ 371 (c)(1),
(2), (4) Date: Mar. 28, 2014

(87) PCT Pub. No.: WO2013/044958
PCT Pub. Date: Apr. 4, 2013

(65) Prior Publication Data
US 2014/0226487 A1    Aug. 14, 2014

(51) Int. Cl.
*H04W 4/00*     (2009.01)
*H04W 36/22*    (2009.01)
*H04W 60/00*    (2009.01)
*H04W 28/08*    (2009.01)
*H04W 36/14*    (2009.01)
(Continued)

(52) U.S. Cl.
CPC ............ *H04W 36/22* (2013.01); *H04W 28/08* (2013.01); *H04W 60/005* (2013.01); *H04W 36/14* (2013.01); *H04W 48/06* (2013.01); *H04W 88/06* (2013.01)

(58) Field of Classification Search
CPC ... H04W 36/22; H04W 36/14; H04W 48/06; H04W 60/005; H04W 88/06; H04W 28/08
See application file for complete search history.

(56) References Cited

U.S. PATENT DOCUMENTS

| 2003/0118015 A1 | 6/2003 | Gunnarsson et al. |
| 2011/0190022 A1* | 8/2011 | Rudrapatna ....... H04W 52/0206 455/522 |
| 2011/0222523 A1 | 9/2011 | Fu et al. |

(Continued)

FOREIGN PATENT DOCUMENTS

| SE | WO 2010068155 A1 * | 6/2010 | ............ H04W 48/18 |
| WO | WO 2010/068155 A1 | 6/2010 | |
| WO | WO 2011/094081 A1 | 8/2011 | |

OTHER PUBLICATIONS

International Search Report dated Jun. 1, 2012 corresponding to International Patent Application No. PCT/EP2011/066971.

(Continued)

*Primary Examiner* — Clemence Han
(74) *Attorney, Agent, or Firm* — Squire Patton Boggs (US) LLP (57) ABSTRACT

It is provided an apparatus, comprising monitoring means adapted to monitor a state of a first network element of a first radio access network; detecting means adapted to detect if the state fulfills a condition; enabling means adapted to enable, if the state fulfills the condition, that a user equipment having interfaces for attaching to the first network element and for attaching to a second network element of a second radio access network different from the first radio access network, may attach to the second network element.

18 Claims, 4 Drawing Sheets

(51) Int. Cl.
    *H04W 48/06* (2009.01)
    *H04W 88/06* (2009.01)

(56) References Cited

U.S. PATENT DOCUMENTS

| | | | | |
|---|---|---|---|---|
| 2012/0071168 A1* | 3/2012 | Tomici | ............... | H04W 76/025 455/445 |
| 2012/0263145 A1* | 10/2012 | Marinier | ............... | H04W 36/22 370/331 |
| 2013/0016696 A1* | 1/2013 | Adjakple | ............ | H04W 76/025 370/331 |
| 2013/0329583 A1* | 12/2013 | Vrzic | ................... | H04W 36/30 370/252 |
| 2013/0329694 A1* | 12/2013 | Vrzic | ................. | H04W 36/165 370/331 |
| 2014/0010086 A1* | 1/2014 | Etemad | ............... | H04B 7/0632 370/235 |
| 2014/0050086 A1* | 2/2014 | Himayat | ........... | H04N 21/2365 370/230 |
| 2014/0133294 A1* | 5/2014 | Horn | ................. | H04W 28/0247 370/230 |
| 2014/0153489 A1* | 6/2014 | Perras | .................. | H04W 60/00 370/328 |
| 2014/0341109 A1* | 11/2014 | Cartmell | ............... | H04L 45/308 370/328 |
| 2015/0029879 A1* | 1/2015 | Chou | .................. | H04W 76/002 370/252 |
| 2015/0223243 A1* | 8/2015 | Tabet | ................. | H04W 28/085 370/330 |

OTHER PUBLICATIONS

3GPP TS 23.402 v10.4.0, 3rd Generation Partnership Project; Technical Specification Group Services and System Aspects; Architecture Enhancements for Non-3GPP Accesses (Release 10), Jun. 2011, 231 pages.

3GPP TS 23.402 V8.9.0, 3rd Generation Partnership Project; Technical Specification Group Services and System Aspects; Architecture Enhancements for Non-3GPP Accesses (Release 8), Jun. 2010, 199 pages.

* cited by examiner

DYNAMICALLY EXTENDING MOBILE COVERAGE AND CAPACITY BY OFFLOADING

FIELD OF THE INVENTION

The present invention relates to an apparatus, a method, a system, and a computer program product related to offloading. More particularly, the present invention relates to an apparatus, a method, a system, and a computer program product for dynamically offloading to a second network in case of congestion or under similar conditions.

BACKGROUND OF THE INVENTION

Abbreviations

3GPP 3$^{rd}$ Generation Partnership Project
ANDSF Access Network Discovery and Selection Function
AP Access Point
CPE Customer Premises Equipment
DM Device Management
EAP Extensible Authentication Protocol
ePDG evolved Packet Data Gateway
GGSN Gateway GPRS Support Node
GPRS General Packet Radio Service
MCC Mobile Country Code
MME Mobility Management Entity
MNC Mobile Network Code
OMA Open Mobile Alliance
OTA Over the Air
P-GW Packet Gateway
QoS Quality of Service
RAT Radio Access Technology
SGSN Serving GPRS Support Node
SIM Subscriber Identity Module
SMS Short Message Service
SSID Service Set Identifier
TR Technical Report
TS Technical Specification
Wi-Fi Wireless Fidelity (WLAN multivendor and interoperability compatibility)
WLAN Wireless Local Area Network The present application is related to offloading, in particular Wi-Fi offloading. In order to address increasing mobile data traffic volumes and improve user experience for data services, operators upgrade and optimize their mobile networks. In addition, an increasing number of operators uses or plans to use Wi-Fi networks to complement their mobile networks. This will allow the operators to carry larger volumes of traffic and support higher number of users cost efficiently.

Some aspects of interworking between mobile and Wi-Fi networks are specified in 3GPP TS 23.402 from release 8 onwards. According to this TS, an ANDSF influences an access network selection of the UE, and the ePDG integrates traffic coming via an untrusted Wi-Fi network into the packet core.

Mobile operators have introduced charging models and mechanisms for mobile access supporting their business needs. For example when user is accessing data services, the operator charges the user based on used data volume. In such a case the operator wants to keep the user on mobile network when possible to charge more for data usage. However, the operator needs to ensure also that users using mobile networks experience good user experience, which congested cell would prevent.

Some operators are also concerned about the user spending a lot of time on Wi-Fi because it might erode their brand.

In addition, some operators are only learning of using Wi-Fi networks and are not yet assured that Wi-Fi networks are able to meet quality of service/experience criteria in similar way as mobile networks do. Therefore the operator might not want to encourage Wi-Fi use every time when available.

3GPP TS 23.402 release 8 has introduced ANDSF (Access Network Discovery and Selection Function) allowing an operator to have greater control when a defined Wi-Fi network will be used, for example by defining access network selection priorities; 1) Operator hotspot 2) Operator partner hotspot 3) 3GPP network. According to the example 3GPP ANDSF rules of 3GPP TS 23.402 release 10.4.0, a user device will always connect to Operator hotspot for IP traffic when available and the device uses mobile network (3GPP) only if defined Wi-Fi networks are not available. In addition ANDSF allows an operator to define time of day and location when certain Wi-Fi network selection policies are to be used. Because ANDSF is based on Device Management (OMA DM, Open Mobile Alliance Device Management) technologies, only infrequent communication is feasible between user device and ANDSF server (for example SMSs may be used in addition to IP connection to trigger device to get latest ANDSF information) and ANDSF is not feasible for real time control over device access network use.

Besides, ANDSF is not supported by today's user devices. It is expected that only new devices will support ANDSF and that a lot of existing devices, which do not support ANDSF will remain in operation for the next years. Therefore, backward compatibility has to be ensured.

A user may select manually Wi-Fi network, for example when bitrates are low in 3G network. However, manual Wi-Fi network selection takes time and effort and masses are not willing to take the extra effort but just want things to work. In addition, when user controls network selection manually an operator has no control over which access network is used.

SUMMARY OF THE INVENTION

It is an object of the present invention to improve the prior art.

In particular, it is an object to handle overload or fault situations without strongly affecting the user experience.

According to a first aspect of the invention, there is provided an apparatus, comprising monitoring means adapted to monitor a state of a first network element of a first radio access network; detecting means adapted to detect if the state fulfills a condition; enabling means adapted to enable, if the state fulfills the condition, that a user equipment having interfaces for attaching to the first network element and for attaching to a second network element of a second radio access network different from the first radio access network, may attach to the second network element.

In the apparatus, the state may comprise a traffic load, and the condition may be fulfilled if the traffic load exceeds a first predetermined threshold; and/or the state may comprise a congestion of a cell of the first network element, and the condition may be fulfilled if the congestion occurs; and/or the state may comprise a fault state indicating that the first network element is not able to cope with a predetermined traffic, and the condition may be fulfilled if the fault state occurs; and/or the state may comprise a number of subscribers in the cell, and the condition may be fulfilled if the number of subscribers exceeds a second predetermined threshold; and/or the state may comprise a quality of service, and the condition may be fulfilled if the quality of service is not provided.

In the apparatus, the enabling means may comprise network on-triggering means adapted to trigger the second network element to start operation.

In the apparatus, the enabling means may comprise second preference setting means adapted to set the user equipment such that it preferably attaches to the second network element rather than to the first network element.

The apparatus may further comprise disabling means adapted to disable, if the state does not fulfill the condition, that the user equipment attaches to the second network element.

In the apparatus, the disabling means may comprise network off-triggering means adapted to trigger the second network element to stop operation.

In the apparatus, the disabling means may comprise first preference setting means adapted to set the user equipment such that it preferably attaches to the first network element rather than to the second network element.

The apparatus may further comprise predicting means adapted to predict that the state will fulfill the condition; wherein the enabling means may be adapted to enable, if the predicting means predicts that the state will fulfill the condition, that the user equipment may attach to the second network element.

The apparatus may further comprise first location determining means adapted to determine a first location of the first network element; second location determining means adapted to determine a second location of the second network element; and distance determining means adapted to determine a distance from the determined first and second locations; wherein the enabling means may be additionally adapted to enable that the user equipment may attach to the second network element only if the distance does not exceed a predetermined value.

According to a second aspect of the invention, there is provided an apparatus, comprising monitoring processor adapted to monitor a state of a first network element of a first radio access network; detecting processor adapted to detect if the state fulfills a condition; enabling processor adapted to enable, if the state fulfills the condition, that a user equipment having interfaces for attaching to the first network element and for attaching to a second network element of a second radio access network different from the first radio access network, may attach to the second network element.

In the apparatus, the state may comprise a traffic load, and the condition may be fulfilled if the traffic load exceeds a first predetermined threshold; and/or the state may comprise a congestion of a cell of the first network element, and the condition may be fulfilled if the congestion occurs; and/or the state may comprise a fault state indicating that the first network element is not able to cope with a predetermined traffic, and the condition may be fulfilled if the fault state occurs; and/or the state may comprise a number of subscribers in the cell, and the condition may be fulfilled if the number of subscribers exceeds a second predetermined threshold; and/or the state may comprise a quality of service, and the condition may be fulfilled if the quality of service is not provided.

In the apparatus, the enabling processor may comprise network on-triggering processor adapted to trigger the second network element to start operation.

In the apparatus, the enabling processor may comprise second preference setting processor adapted to set the user equipment such that it preferably attaches to the second network element rather than to the first network element.

The apparatus may further comprise disabling processor adapted to disable, if the state does not fulfill the condition, that the user equipment attaches to the second network element.

In the apparatus, the disabling processor may comprise network off-triggering processor adapted to trigger the second network element to stop operation.

In the apparatus, the disabling processor may comprise first preference setting processor adapted to set the user equipment such that it preferably attaches to the first network element rather than to the second network element.

The apparatus may further comprise predicting processor adapted to predict that the state will fulfill the condition; wherein the enabling processor may be adapted to enable, if the predicting processor predicts that the state will fulfill the condition, that the user equipment may attach to the second network element.

The apparatus may further comprise first location determining processor adapted to determine a first location of the first network element; second location determining processor adapted to determine a second location of the second network element; and distance determining processor adapted to determine a distance from the determined first and second locations; wherein the enabling processor may be additionally adapted to enable that the user equipment may attach to the second network element only if the distance does not exceed a predetermined value.

According to a third aspect of the invention, there is provided an apparatus, comprising trigger detecting means adapted to detect a received trigger related to a state of a first network element of a first radio access network; commanding means adapted to command, if the trigger is detected, a second network element of a second radio access network different from the first radio access network to start operating.

According to a fourth aspect of the invention, there is provided an apparatus, comprising trigger detecting processor adapted to detect a received trigger related to a state of a first network element of a first radio access network; commanding processor adapted to command, if the trigger is detected, a second network element of a second radio access network different from the first radio access network to start operating.

According to a fifth aspect of the invention, there is provided an apparatus, comprising trigger detecting means adapted to detect a received trigger related to a state of a first network element of a first radio access network; commanding means adapted to command, if the trigger is detected, a user equipment having interfaces for attaching to the first network element and for attaching to a second network element of a second radio access network different from the first radio access network to preferably attach to the second network element.

According to a sixth aspect of the invention, there is provided an apparatus, comprising trigger detecting processor adapted to detect a received trigger related to a state of a first network element of a first radio access network; commanding processor adapted to command, if the trigger is detected, a user equipment having interfaces for attaching to the first network element and for attaching to a second network element of a second radio access network different from the first radio access network to preferably attach to the second network element.

The apparatus according to any of the first, third, and fifth aspects may further comprise external monitoring means adapted to monitor an external state, wherein the external state is not a state of the first network element; external detecting means adapted to detect if the external state fulfills an external condition; wherein the enabling means is adapted to enable, if the external condition is fulfilled, that the user equipment may attach to the second network element.

The apparatus according to any of the second, fourth, and sixth aspects may further comprise external monitoring processor adapted to monitor an external state, wherein the external state is not a state of the first network element; external detecting processor adapted to detect if the external state fulfills an external condition; wherein the enabling processor is adapted to enable, if the external condition is fulfilled, that the user equipment may attach to the second network element.

In the apparatus according to any of the first to sixth aspects, the external state may comprise a trigger command, and the external condition may be fulfilled if the trigger command is received; and/or the external state may comprise a predefined time, and the external condition may be fulfilled at the predefined time.

In the apparatus according to any of the first to sixth aspects, the first radio access network may be of a first radio access technology, and the second radio access network may be of a second radio access technology different from the first radio access technology.

According to a seventh aspect of the invention, there is provided a method, comprising monitoring a state of a first network element of a first radio access network; detecting if the state fulfills a condition; enabling, if the state fulfills the condition, that a user equipment having interfaces for attaching to the first network element and for attaching to a second network element of a second radio access network different from the first radio access network, may attach to the second network element.

The method may be a method of offloading.

In the method, the state may comprise a traffic load, and the condition may be fulfilled if the traffic load exceeds a first predetermined threshold; and/or the state may comprise a congestion of a cell of the first network element, and the condition may be fulfilled if the congestion occurs; and/or the state may comprise a fault state indicating that the first network element is not able to cope with a predetermined traffic, and the condition may be fulfilled if the fault state occurs; and/or the state may comprise a number of subscribers in the cell, and the condition may be fulfilled if the number of subscribers exceeds a second predetermined threshold; and/or the state may comprise a quality of service, and the condition may be fulfilled if the quality of service is not provided.

In the method, the enabling may comprise triggering the second network element to start operation.

In the method, the enabling may comprise setting the user equipment such that it preferably attaches to the second network element rather than to the first network element.

The method may further comprise disabling, if the state does not fulfill the condition, that the user equipment attaches to the second network element.

In the method, the disabling may comprise triggering the second network element to stop operation.

In the method, the disabling may comprise setting the user equipment such that it preferably attaches to the first network element rather than to the second network element.

The method may further comprise predicting that the state will fulfill the condition; and enabling, if the predicting means predicts that the state will fulfill the condition, that the user equipment may attach to the second network element.

The method may further comprise determining a first location of the first network element; determining a second location of the second network element; and determining a distance from the determined first and second locations; wherein the enabling may be performed only if the distance does not exceed a predetermined value.

According to an eighth aspect of the invention, there is provided a method, comprising detecting a received trigger related to a state of a first network element of a first radio access network; commanding, if the trigger is detected, a second network element of a second radio access network different from the first radio access network to start operating.

The method may be a method of offloading.

According to a ninth aspect of the invention, there is provided a method, comprising detecting a received trigger related to a state of a first network element of a first radio access network; commanding, if the trigger is detected, a user equipment having interfaces for attaching to the first network element and for attaching to a second network element of a second radio access network different from the first radio access network to preferably attach to the second network element.

The method according to any of the seventh to ninth aspects may further comprise monitoring an external state, wherein the external state is not a state of the first network element; detecting if the external state fulfills an external condition; and enabling, if the external condition is fulfilled, that the user equipment may attach to the second network element.

In the method according to any of the seventh to ninth aspects, the external state may comprise a trigger command, and the external condition may be fulfilled if the trigger command is received; and/or the external state may comprise a predefined time, and the external condition may be fulfilled at the predefined time.

In the method according to any of the seventh to ninth aspects, the first radio access network may be of a first radio access technology, and the second radio access network may be of a second radio access technology different from the first radio access technology.

According to a tenth aspect of the invention, there is provided a computer program product including a program comprising software code portions being arranged, when run on a processor of an apparatus, to perform the method according to any one of the seventh to ninth aspects.

The computer program product may comprise a computer-readable medium on which the software code portions are stored, and/or the program may be directly loadable into a memory of the processor.

According to embodiments of the invention, at least the following advantages are achieved:

Traffic may be kept in the operator's mobile network as much as possible without impacting the user experience, but effective measures are taken if the user experience is (potentially) affected. Thus, the operator may preserve (or get) a positive recognition by the users.

Also, some operators may prevent users from accessing Wi-Fi except under some selected conditions, like when there's congestion in the mobile network cell of a user. This is in particular interesting for operators learning about Wi-Fi usage, when volume based charging is used but still user experience needs to be on certain level, when policy control rules are applied to subscriber via mobile network and GGSN functionality etc.

Some embodiments of the invention use existing interfaces and may, thus, be implemented quickly and without strongly affecting lots of network elements. In particular, user equipments may not be involved and the requirements for backward compatibility may be relaxed.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein.

DETAILED DESCRIPTION OF CERTAIN EMBODIMENTS

Herein below, certain embodiments of the present invention are described in detail with reference to the accompanying drawings, wherein the features of the embodiments can be freely combined with each other unless otherwise described. However, it is to be expressly understood that the description of certain embodiments is given for by way of example only, and that it is by no way intended to be understood as limiting the invention to the disclosed details.

Moreover, it is to be understood that the apparatus is configured to perform the corresponding method, although in some cases only the apparatus or only the method are described.

According to embodiments of the invention, the existing solutions for interworking of mobile radio access and Wi-Fi (such as described in 3GPP release 8 TS 23.402) are complemented and improved by introducing an operator tool to move selected subscribers to a Wi-Fi network based on need (rather than by default), for example at congestion in mobile macro cell, and to direct selected users to the (Wi-Fi) hotspot. By providing the new tool to the operator, the operator may for example charge users per traffic volume on mobile network but once mobile network starts getting congested some users may be offloaded to Wi-Fi hotspot in order to maintain certain level of user experience for the users. Thus, the operator may simultaneously increase his revenues for data services without negatively affecting his reputation in this respect.

Today available technologies don't offer an operator dynamic tools to control when a user should offload traffic to Wi-Fi hotspot and when the user should use mobile networks. Even though current ANDSF introduces important new features, it is not applicable for dynamically online controlling user device access network selection, for example when mobile network cell gets congested only then use Wi-Fi network and not otherwise.

A monitoring tool like Nokia Siemens Network's Traffica RNC may be used to monitor mobile network operation and defined criteria, for example to detect or predict cell congestion. In some embodiments of the invention, the monitoring tool may additionally include "traffic steering control" functionality, i.e. deciding when defined users/user devices need to be moved to another network, like Wi-Fi. The monitoring tool may be able to provide (near) real time monitoring. That is, the information on at least some selected criteria may be available within seconds or a few (e.g. 1, 2, 5, 10, 15, 30, 60) minutes after the occurrence in the network. Based on the information of the past or information provided by surrounding network elements (like SGSN, MME, GGSN, P-GW handling user plane), the monitoring tool may predict a traffic behaviour in the future.

When cell congestion occurs (or is predicted), the monitoring tool may trigger activation of a Wi-Fi hotspot within the area of the congested cell. In some embodiments, device management and/or ANDSF or alike may have been used to configure beforehand Wi-Fi network selection rules to user devices (for example when user buys data subscription) and once the newly activated Wi-Fi hotspot becomes available, these user devices will automatically start using the Wi-Fi hotspot for IP services (or selected IP services, based on for example ANDSF rules).

In some embodiments, device management and/or ANDSF or alike may configure the Wi-Fi hotspot as preferred access network in user device based on a trigger from an element performing traffic steering decisions such as the monitoring tool. The trigger may comprise e.g. information like cell congestion of a specific cell or failure of a specific cell to handle (part of) traffic.

Once a defined criterion like mobile cell congestion ends, is fulfilled, the monitoring tool may trigger deactivation of the Wi-Fi hotspot to ensure user devices use operator mobile network as primary network. In some embodiments, it may configure the user devices such that the Wi-Fi network or a hotspot thereof is not a preferred access network any more.

Thus, according to embodiments of the invention, tools to dynamically/online complement mobile network with additional Wi-Fi network capacity and ensure selected user devices start using the defined Wi-Fi network only when needed are provided.

The following describes some details of embodiments of the invention.

Wi-Fi Network

Typically, a Wi-Fi AP providing Wi-Fi access has one SSID on the Wi-Fi radio visible to user devices. In order to provide dynamic Wi-Fi network availability for selected user devices, preferably an operator uses hotspot where the Wi-Fi AP has more than one SSID on Wi-Fi radio (called guest/virtual/dual SSID), see FIG. 1.

Figure 1:
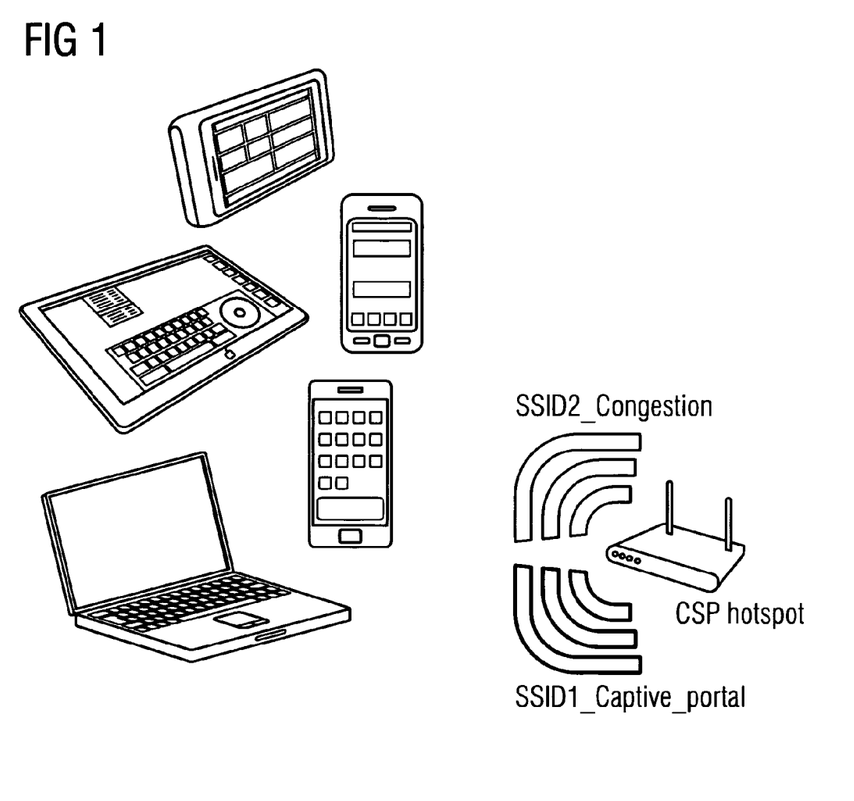
FIG. 1 shows an operator hotspot with dual SSID.
Figure 2:
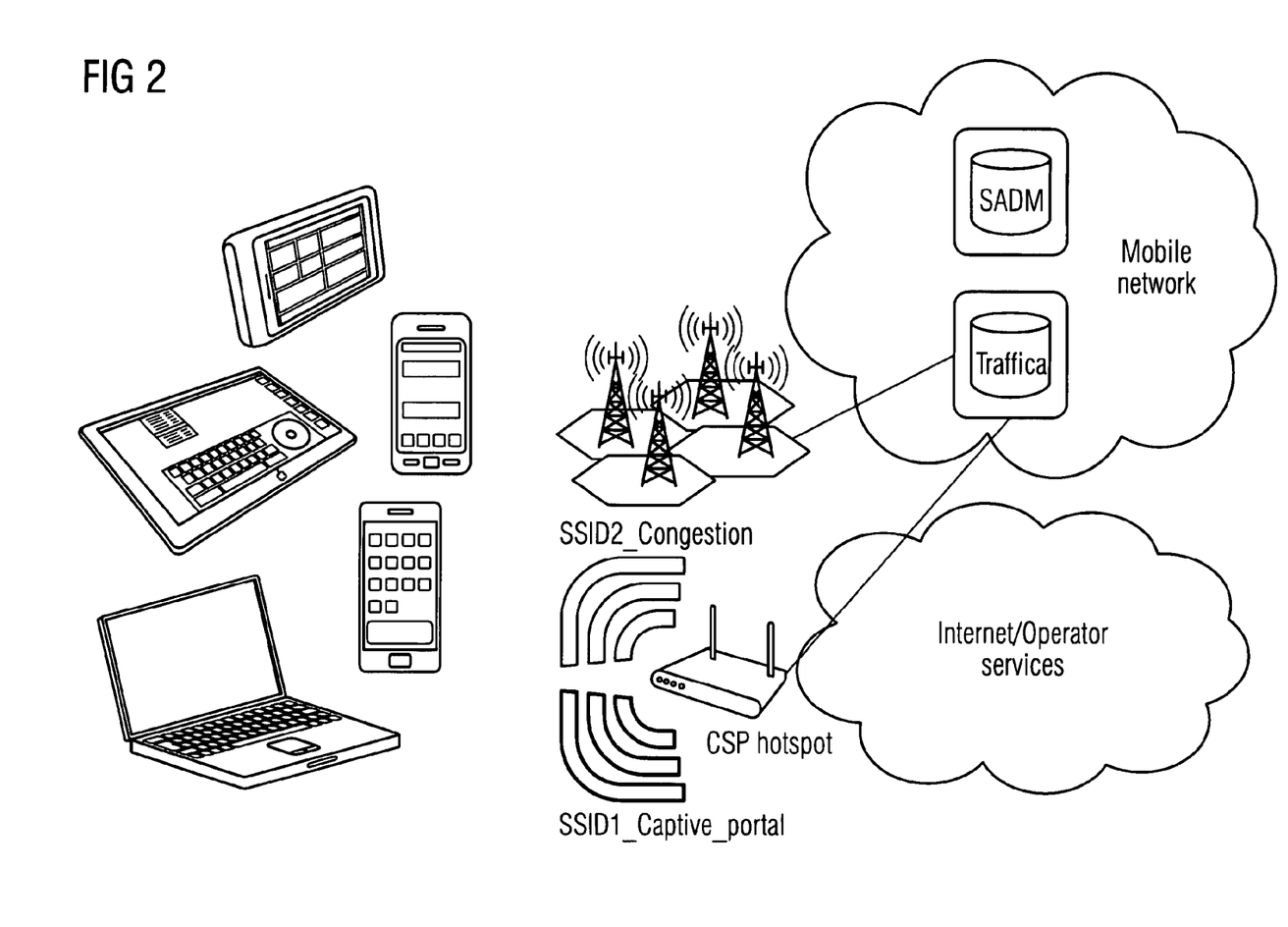
FIG. 2 shows a system comprising an apparatus according to an embodiment of the invention.

SSID1 (in the figure called SSID1_Captive_portal) is used for normal hotspot access. For example, a laptop user may access SSID1 and get access to services. In the figure, SSID1 provides Captive portal authentication (web logon using username and password) as an example. SSID1 may be available all the time for ser devices (static configuration).

SSID2 (in the figure SSID2_Congestion) is a dynamic SSID that the operator may activate and deactivate according to need. In the figure, SSID2 provides SIM based authentication (EAP-SIM) as an example. SSID2 is visible to user devices only when it is activated based on defined criteria.

By introducing additional SSIDs (SSID3, SSID4), an operator may control group of user devices that start using Wi-Fi network instead of using mobile network (by pre-configuring different SSIDs into different user devices, for example mobile subscription gold, silver and bronze users are dedicated to SSID2, SSID3 and SSID4 groups).

In Wi-Fi AP a SSID may be public or hidden. Public SSID means the AP broadcasts the SSID openly which allows easier detection of the SSID by user devices. Hidden SSID means that once user device detects Wi-Fi transmission without visible SSID, user device needs to ask separately from Wi-Fi AP what is the SSID. Thus, as an option to activate/deactivate a second (dual/guest) SSID on need basis, the public/hidden status of SSID2 might be changed to allow easier/harder detection and use of SSID2 like SSID2_Congestion.

Within the context of this application, each SSID may be considered as a network element, even though the different SSIDs are implemented in the same physical device.

In some embodiments, the operator dedicates selected hotspots (Wi-Fi APs) for dynamic use. In this case, the Wi-Fi AP (hotspot) is turned off if the defined criteria are not fulfilled. Thus, in contrast to the case of having multiple SSIDs whereof one or more SSIDs serve users permanently, nobody is able to use the hotspot except for the times when the criteria are fulfilled.

SSID and hotspot authentication method are preferably the same for all operator hotspots that can be activated and deactivated dynamically. This makes it easier to configure user devices. For example, one may use SSID2_Congestion as SSID with EAP-SIM authentication method for all "dynamic hotspots".

User Device Configuration

Device Management (DM) server, like Nokia Siemens Network's SADM (Serve at Once Device Management), may be used to configure user devices automatically over the air (OTA). DM server may configure into user devices Wi-Fi network settings, like SSID, and used authentication method, like EAP-SIM (SIM based user authentication). This allows an operator to automatically configure operator preferred Wi-Fi network entries, like operator hotspot, operator partner hotspots and even home Wi-Fi network settings (if known by the operator) to the user devices.

According to embodiments of the invention, OTA user device configuration capability is used in the following way:
  For defined users, home operator wants to keep user data traffic in mobile network when possible and meaningful. For example subscription is based on volume based charging and thus the operator sees beneficial to keep the user on mobile network where various charging methods and policy control rules can be applied.
  For these users the operator doesn't configure SSID1 (of the example above) providing normal hotspot access using DM and OTA mechanisms. However, for these users operator configures dynamic SSID2 (e.g. SSID2_Congestion) using DM and OTA mechanisms.

Some user devices, e.g. Apple's iPhone, Android based devices, Nokia devices etc., prioritize Wi-Fi over mobile network. Therefore, in case that SSID2 is preconfigured into the user device and becomes available, these user devices take the preconfigured network automatically into use—but only when SSID2 is activated on Wi-Fi AP (or in case of hidden SSID2, SSID2 is made public and device detects this).

If a user device does not automatically prioritize Wi-Fi over the mobile network, the DM may prioritize Wi-Fi in case a certain condition is fulfilled. For this purpose, the DM may be triggered by the monitoring tool. That is, the monitoring tool may provide information to the DM which cell is congested, out of service etc., preferably together with a user identity, like MSISDN. In some embodiments, the monitoring tool provides information which Wi-Fi AP are to be preferred, too. In other embodiments, this selection may be done by the DM.

3GPP ANDSF server (TS 23.402 release 8 onwards) will allow an operator to configure more detailed network selection policies to user devices than described above, like priorities for different Wi-Fi networks, location or time when certain Wi-Fi network should be used when available etc. When ANDSF becomes available, ANDSF can be used to prioritize use of defined access networks. However, ANDSF (as of TS 23.402 latest release 10.4.0) does not solve the problem of online and dynamically deciding when user devices should use Wi-Fi hotspot and when mobile network, for example based on cell congestion in mobile network. This function is provided by embodiments of the invention.

Monitoring Tool

Home operator may enable a monitoring tool like Nokia Siemens Networks' Traffica to monitor and detect network conditions, like congestion in mobile cell. Once a defined condition occurs, in some embodiments the monitoring tool may communicate to nearby hotspot (directly or to Wi-Fi network management system and thus indirectly to Wi-Fi hotspot), and trigger activation of SSID, like SSID2, to start serving for user devices. When the monitoring tool requests Wi-Fi AP to activate SSID2, nearby iPhones, Androids etc. and other user devices for which Wi-Fi access is configured as the preferred access network will detect the available SSID2 through for example periodic scanning and take the Wi-Fi hotspot with SSID2 automatically into use. Therefore, a portion of data traffic (optionally also VoIP) is moved from mobile network to Wi-Fi hotspot. The result is a less congested mobile cell and improved user experience.

The monitoring tool may contain one or many of the following functionalities. The functionalities may also be divided between multiple network elements:
  Detecting or predicting cell/network congestion, too high cell/network load, inability to maintain required QoS for defined users etc.
  Associating problem situation to a location, like cell area, and identifying Wi-Fi networks nearby the location
  Communicating with the Wi-Fi network or Wi-Fi network management system in order to activate or deactivate an SSID (like SSID2_Congested)
  Optionally associating users/user devices being affected by network problems and deciding to move selected users where feasible In the following, examples are listed how the monitoring tool may be able to identify which Wi-Fi hotspot SSID2 shall be activated when a certain mobile cell becomes e.g.

congested. The monitoring tool (or some other network element interfacing the monitoring tool) needs to implement network neighbourhood mapping list, where mobile network cell areas are mapped to Wi-Fi hotspots visible under mobile network cells.

An operator may provide the mapping information, for example where Location Area Code (LAC) and/or Routing Area Code (RAC) and/or Cell Identity (CI) is mapped to one or more Wi-Fi hotspots. When given cell becomes congested, the monitoring tool knows which Wi-Fi hotspot SSID2s to activate.

Google Maps or another mapping application may be used to determine Wi-Fi hotspots in the area of mobile network cell, for example in case mobile cells and Wi-Fi hotspots are given street address information. The monitoring tool may determine which Wi-Fi hotspots should be visible for user devices in the cell and activate SSID2 within these Wi-Fi hotspots (based on e.g. expected Wi-Fi hotspot indoor and outdoor coverage areas).

If an operator has attached GPS coordinates to each mobile cell and Wi-Fi hotspot, the monitoring tool may be able to calculate which Wi-Fi hotspots should be visible to user devices using defined mobile network cell.

As a further option, if a user device can be requested to provide its GPS coordinates, LAC, RAC, CI or alike, or if the mobile network knows user device location, the monitoring tool may be able to pinpoint one or more appropriate Wi-Fi hotspots within coverage area of the user device.

As an option, a user device may provide or can be requested to provide list of Wi-Fi networks (e.g. SSIDs) it detects, allowing monitoring tool to identify Wi-Fi networks where SSID2 shall be activated.

In case congestion occurs in core network elements or interfaces, like SGSN, GGSN, MME, Serving-GW, PDN-GW, etc. or network load is too high to maintain required QoS for defined users, load may be associated with a geographical area (e.g. based on interfaces, like Gb in GPRS, transferring user traffic) and based on the information SSID2s of affected Wi-Fi networks can be activated to reduce overall network load by offloading traffic to Wi-Fi.

Each Wi-Fi hotspot may be given address information allowing the monitoring tool to communicate to Wi-Fi hotspot management system either directly or through vendor specific system (where e.g. Wi-Fi controller communicates with Wi-Fi AP according to instructions from the monitoring tool). The monitoring tool may communicate with Wi-Fi AP using Wi-Fi vendor specific Wi-Fi network management system to which the monitoring tool may be integrated, or for example by using Broadband Forum TR-069 standard used for CPE and Wi-Fi AP management (in case Wi-Fi AP supports TR-069).

The following exemplary and non-exhaustive conditions may trigger the monitoring tool to activate SSID2 in selected Wi-Fi hotspot(s):

Load of mobile cell exceeds set threshold or congestion is detected in a cell

If the monitoring tool monitors traffic patterns, it may predict heavier load in a cell and based on the prediction, it may trigger activation of SSID2

The monitoring tool may be able to detect a situation where too many subscribers are using a given cell and, thus, WI-Fi hotspot SSID2 may be activated to ensure service level for users The monitoring tool may get a notification from another network element (SGSN, MME, GGSN, P-GW etc.), for example when QoS cannot be maintained for users in core network. The monitoring tool may be able to map the request to mobile network geographical location (like cell(s)) to activate Wi-Fi hotspot SSID2. For example SGSN/MME may report to the monitoring tool heavy load related to a certain interface link which is mapped to cells.

An operator may also define "fixed" pattern for SSID2 activation, for example during busy hour SSID2 is activated in hotspots located at the train station. Or when there is a sport event in stadium or a concert, SSID2 is activated on nearby Wi-Fi networks.

In case mobile network or a cell of its network goes down (fully or partly out of use), more Wi-Fi capacity can be activated allowing Wi-Fi capable devices to use Wi-Fi as mobile network backup.

In order to avoid a situation where selected users use all the time SSID2 when available instead of using mobile network, under the following exemplary and non-exhaustive conditions the monitoring tool may trigger deactivation of SSID2 in selected Wi-Fi hotspot(s):

Mobile cell is no longer congested and/or has load/usage below defined threshold Defined amount of time has passed since activating SSID2 in a hotspot Certain user causing traffic to mobile network cell has moved to another area Time condition, like busy hour, doesn't apply anymore Core network element/interface load goes below a threshold In order to avoid activating and deactivating hotspot SSID2 constantly, defined delay/guard period may be used after SSID2 activation condition(s) has passed before triggering deactivation of SSID2 in selected Wi-Fi hotspot(s). Alternatively or in addition, a hysteresis between corresponding conditions for activation and deactivation may be defined.

In some embodiments, the monitoring tool may trigger the DM to set Wi-Fi as preferred access network when a condition for activation is fulfilled, and to set the mobile network as preferred access network when a condition for deactivation is fulfilled. In some embodiments, both SSID (de-)activation and the preference setting in the user device may be performed. In such a case users using given cell/located in given geographical area need to be identified. Monitoring tool may for example have interfaces to core network elements, like SGSN/GGSN/MME/S-GW/P-GW/HLR/HSS, which would be able to associate temporary user radio access network identifiers to MSISDN number allowing DM server to contact specific user device.

Figure 3:
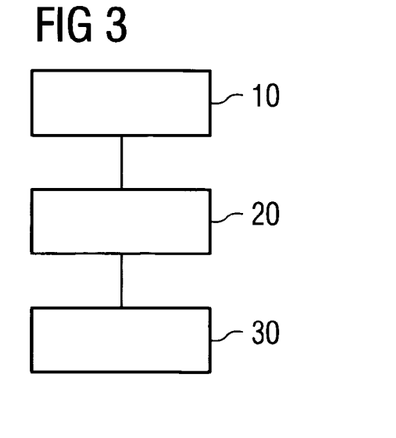
FIG. 3 shows an apparatus according to an embodiment of the invention.
Figure 4:
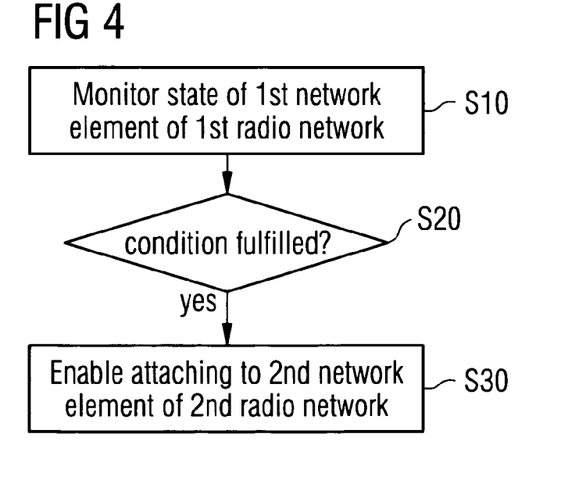
FIG. 4 shows a method according to an embodiment of the invention.

FIG. 3 shows an apparatus according to an embodiment of the invention. The apparatus may be a monitoring system. FIG. 4 shows a method according to an embodiment of the invention. The apparatus according to FIG. 3 may perform the method of FIG. 4 but is not limited to this method. The method of FIG. 4 may be performed by the apparatus of FIG. 3 but is not limited to being performed by this apparatus.

The apparatus comprises monitoring means 10, detecting means 20, and enabling means 30.

The monitoring means 10 monitors a state of the network such as congestion of a cell (S10). The detecting means 20 detects if a condition like "congestion occurs" is fulfilled (S20). If the condition is fulfilled, the enabling means 30 takes care that a user equipment with suitable interfaces has the option to attach to a Wi-Fi hotspot (S30). For example, the enabling means 30 may trigger activation of a Wi-Fi hotspot and/or trigger to set the Wi-Fi hotspot as a preferred access network over the mobile network. In some embodiments, the Wi-Fi hotspot may be activated through the Wi-Fi management system, and/or setting of the preference of the user device may be performed through a device management system.

In some embodiments, the monitoring system may only monitor a state of the network and provide an information (trigger) about a fulfilled condition of the state to the Wi-Fi management system and/or the device management system. These management systems may select the appropriate action depending on the trigger information.

In some embodiments, the monitoring system may only monitor a state of the mobile network and provide an information (trigger) about a fulfilled condition of the state to an external function, like Radio Resource Management, which would trigger "traffic steering/handover" actions for selected user(s) towards Wi-Fi network.

Figure 5:
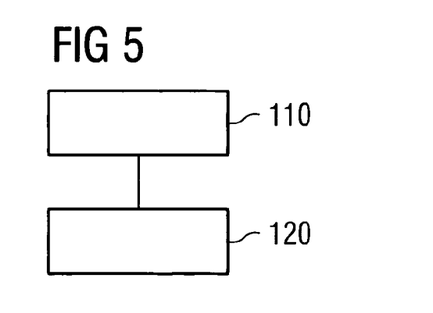
FIG. 5 shows an apparatus according to an embodiment of the invention.
Figure 6:
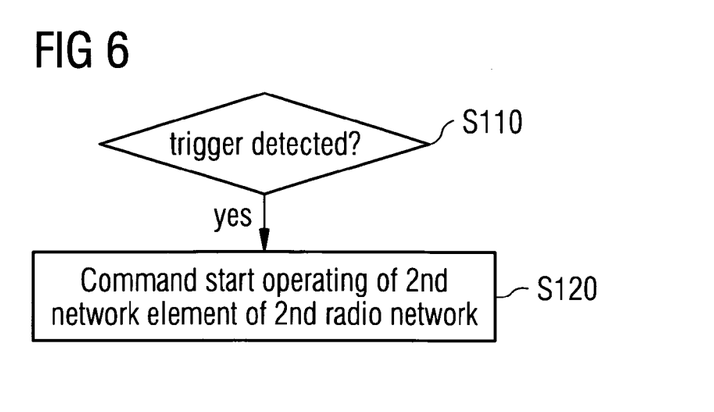
FIG. 6 shows a method according to an embodiment of the invention.

FIG. 5 shows an apparatus according to such an embodiment of the invention. The apparatus may be a Wi-Fi management system. FIG. 6 shows a method according to an embodiment of the invention. The apparatus according to FIG. 5 may perform the method of FIG. 6 but is not limited to this method. The method of FIG. 6 may be performed by the apparatus of FIG. 5 but is not limited to being performed by this apparatus.

The apparatus comprises trigger detecting means 110, and commanding means 120.

If the trigger detecting means 110 detects a trigger related to a state of the network (or one of its network elements) (S110), the commanding means 120 may activate a corresponding WiFi hotspot (S120). In detail, the commanding means 120 may decide if any hotspot is to be activated and which hotspot will be activated. Such a decision may be based e.g. on the same or corresponding location information as outlined above with respect to the monitoring system. In addition, the commanding means may take into account information on the Wi-Fi network such as congestion in the Wi-Fi network or hotspots which are out of order.

Figure 7:
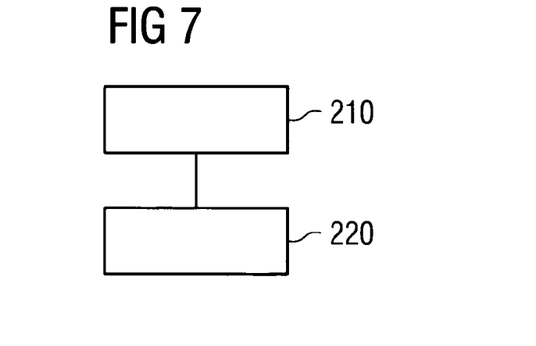
FIG. 7 shows an apparatus according to an embodiment of the invention.
Figure 8:
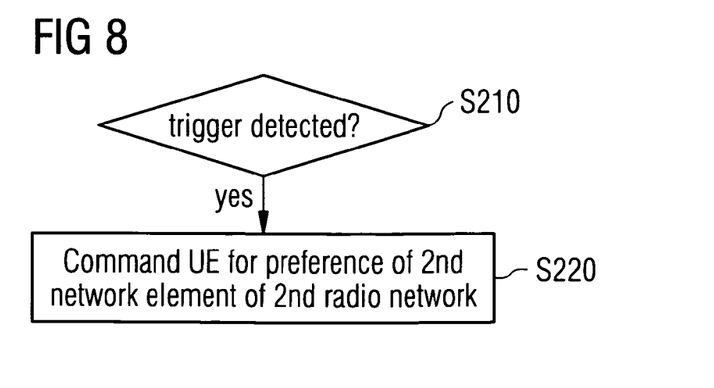
FIG. 8 shows a method according to an embodiment of the invention.

FIG. 7 shows an apparatus according to an embodiment of the invention, where a device management system decides about setting of preferred access networks in the user devices. The apparatus may be a device management system. FIG. 8 shows a method according to an embodiment of the invention. The apparatus according to FIG. 7 may perform the method of FIG. 8 but is not limited to this method. The method of FIG. 8 may be performed by the apparatus of FIG. 7 but is not limited to being performed by this apparatus.

The apparatus comprises trigger detecting means 210, and commanding means 220.

If the trigger detecting means 210 detects a trigger related to a state of the network (or one of its network elements) (S210), the commanding means 220 may decide to set the preferred access network of some or all of the user devices to Wi-Fi hotspots (S220). Such a decision may be based on location information of the affected network element and location information of the user devices (if available). In addition, the commanding means may take into account information on the user devices. E.g., it may be known that some user devices have problems with accessing Wi-Fi (although they have a Wi-Fi interface). In such user devices, the mobile network may be maintained as preferred access network.

Example Scenario

The following describes an example scenario how an embodiment of the invention may work:

Operator provides mobile services for a train station that many people use to commute back and forth to/from work.

By default the operator has enough of mobile network capacity to serve users nearby the train station. Thus Wi-Fi hotspots with SSID1 are only activated and users are either paying for their Wi-Fi access, or use of the SSID1 is granted to certain users as part of their subscription.

Between 7.30 am-9.00 am and 3.30 pm-5.30 pm the operator has noted that when people travel to and from work and wait for their trains to arrive/leave, the people read emails, news and spend their time by using mobile entertainment services (like streaming YouTube video and Internet radio). Thus mobile network cells within train station get congested downgrading user experience.

The operator has configured his monitoring tool to detect congestion in mobile network cells and activate SSID2 in Wi-Fi hotspots within the train station. As an option, SSID2 may be activated in a fixed manner for a fixed period, for example Mon-Fri during busy hours.

As a result, in busy hours (e.g. 7.30 am-9.00 am and 3.30 pm-5.30 pm, but also when congestion is detected at other times) user devices with WiFi access capability passing through the train station will detect Wi-Fi hotspot with SSID2. Since SSID2 has been preconfigured to some of the user devices, they will select SSID2 automatically without prompting the user. Outside busy hours SSID2 is not available and, thus, the user devices use operator's mobile network.

As a result operator mobile network is much less congested during busy hours and user experience is improved for operator subscribers.

When busy hours ends, the monitoring system may deactivate Wi-Fi hotspot SSID2 in train station's hotspots. Accordingly, all user devices use again only the mobile network and the operator is able to do volume based charging etc. for these users.

Embodiments of the invention are described based on an LTE system but embodiments of the invention may be applied to UMTS or any other radio access network (e.g. GERAN, EDGE, 3G, HSPA, CDMA, WiMAX) where offloading to another radio access technology may be employed. The other radio access technology need not to be Wi-Fi as described with respect to embodiments of the invention, but may be any other radio access technology different from the first radio access technology, such as UMTS, GERAN, etc.

In some embodiments, offloading to a radio access network of the same technology may be triggered by the monitoring tool. For example, if a Wi-Fi AP of one operator is detected as being congested by the monitoring system, it may trigger offloading to a Wi-Fi AP of another operator such as a roaming partner by one of the mechanism described above for offloading to another technology.

In some embodiments, instead or in addition to monitoring a cell's operation, a resource shortage within another network element or on surrounding interfaces of a cell or another network element, inability to maintain QoS for (specific) users, etc. may be monitored and detected or even predicted, and this may trigger activation of resources in another network and/or moving user devices to the other network. In some embodiments, the monitoring and detecting or predicting may be performed by the impacted network element or by still another network element. For example SGSN, GGSN, MME, S-GW, P-GW, TTG or ePDG may monitor internal load and/or resource use of the network element/function and detect that there are too many resources being used compromising the ability to maintain QoS/service level for (specific) users and/or the ability to maintain stable network operation. Also a network element may detect that load on surrounding interfaces, like Gn between SGSN and GGSN, is growing too high and may, thus, result into inability to maintain QoS/service level for (specific) users or inability to maintain stable network operation. This may then cause that some UEs will be enabled for offloading to another network (e.g. by activating one or more APs of the other network) as described with respect to the monitoring tool in case of cell congestion. In the same way, in some embodiments, a cell may monitor itself and may trigger corresponding actions in case of overload.

If not otherwise stated or otherwise made clear from the context, the statement that two entities are different means that they are differently addressed in their respective network. It does not necessarily mean that they are based on different hardware. That is, each of the entities described in the present description may be based on a different hardware, or some or all of the entities may be based on the same hardware.

According to the above description, it should thus be apparent that exemplary embodiments of the present invention provide, for example a monitoring apparatus, or a component thereof, an apparatus embodying the same, a method for controlling and/or operating the same, and computer program(s) controlling and/or operating the same as well as mediums carrying such computer program(s) and forming computer program product(s). Further exemplary embodiments of the present invention provide, for example a management entity, or a component thereof, an apparatus embodying the same, a method for controlling and/or operating the same, and computer program(s) controlling and/or operating the same as well as mediums carrying such computer program(s) and forming computer program product(s) controlling and/or operating the same as well as mediums carrying such computer program(s) and forming computer program product(s). Still further exemplary embodiments of the present invention provide, for example an access network selection entity, or a component thereof, an apparatus embodying the same, a method for controlling and/or operating the same, and computer program(s) controlling and/or operating the same as well as mediums carrying such computer program(s) and forming computer program product(s) controlling and/or operating the same as well as mediums carrying such computer program(s) and forming computer program product(s).

Implementations of any of the above described blocks, apparatuses, systems, techniques or methods include, as non limiting examples, implementations as hardware, software, firmware, special purpose circuits or logic, general purpose hardware or controller or other computing devices, or some combination thereof.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. An apparatus, comprising
at least one processor configured to:
monitor a state of a first network element of a first radio access network;
detect if the state fulfills a condition;
determine a first location of the first network element;
determine a second location of a second network element of a second radio access network different from the first radio access network;
determine a distance from the determined first and second locations; and
trigger, if the state fulfills the condition and if the distance does not exceed a predetermined value, a user equipment having interfaces for attaching to the first network element and for attaching to the second network element to attach to the second network element.

2. The apparatus according to claim 1, wherein
the state comprises a traffic load, and the condition is fulfilled if the traffic load exceeds a first predetermined threshold; or
the state comprises a congestion of a cell of the first network element, and the condition is fulfilled if the congestion occurs; or
the state comprises a fault state indicating that the first network element is not able to cope with a predetermined traffic, and the condition is fulfilled if the fault state occurs; or
the state comprises a number of subscribers in the cell, and the condition is fulfilled if the number of subscribers exceeds a second predetermined threshold; or
the state comprises a quality of service, and the condition is fulfilled if the quality of service is not provided.

3. The apparatus according to claim 1, wherein the trigger of the user equipment to attach to the second network element comprises triggering the second network element to start operation.

4. The apparatus according to claim 1, wherein the trigger of the user equipment to attach to the second network element comprises setting the user equipment such that the user equipment attaches to the second network element rather than to the first network element.

5. The apparatus according to claim 1, wherein the east one processor is further configured to
disable, if the state does not fulfill the condition, the user equipment from attaching to the second network element.

6. The apparatus according to claim 5, wherein the disable of the user equipment from attaching to the second network element comprises
triggering the second network element to stop operation.

7. The apparatus according to claim 5, wherein the disable of the user equipment from attaching to the second network element comprises
setting the user equipment such that the user equipment attaches to the first network element rather than to the second network element.

8. The apparatus according to claim 1, wherein the at least one processor is further configured to predict that the state will fulfill the condition, and
wherein the trigger further comprises, if the at least one processor predicts that the state will fulfill the condition, triggering the user equipment to attach to the second network element.

9. The apparatus according to claim 1, wherein the first radio access network is of a first radio access technology, and the second radio access network is of a second radio access technology different from the first radio access technology.

10. An apparatus, comprising
at least one processor configured to:
detect a received trigger related to a state of a first network element of a first radio access network;
determine a first location of the first network element;

determine a second location of a second network element of a second radio access network different from the first radio access network;

determine a distance from the determined first and second locations; and command, if the trigger is detected and if the distance does not exceed a predetermined value, a user equipment having interfaces for attaching to the first network element and for attaching to the second network element, to attach to the second network element.

11. The apparatus according to claim 10, wherein the at least one processor is further configured to:

monitor an external state, wherein the external state is not a state of the first network element;

detect if the external state fulfills an external condition; and if the external condition is fulfilled, trigger the user equipment to attach to the second network element.

12. The apparatus according to claim 11, wherein the external state comprises a trigger command, and the external condition is fulfilled if the trigger command is received; or the external state comprises a predefined time, and the external condition is fulfilled at the predefined time.

13. A method, comprising monitoring a state of a first network element of a first radio access network;

detecting if the state fulfills a condition;

determine a first location of the first network element;

determine a second location of a second network element of a second radio access network different from the first radio access network;

determine a distance from the determined first and second locations; and trigger, if the state fulfills the condition and if the distance does not exceed a predetermined value, a user equipment having interfaces for attaching to the first network element and for attaching to the second network element, to attach to the second network element.

14. The method according to claim 13, wherein the state comprises a traffic load, and the condition is fulfilled if the traffic load exceeds a first predetermined threshold; or the state comprises a congestion of a cell of the first network element, and the condition is fulfilled if the congestion occurs; or the state comprises a fault state indicating that the first network element is not able to cope with a predetermined traffic, and the condition is fulfilled if the fault state occurs; or the state comprises a number of subscribers in the cell, and the condition is fulfilled if the number of subscribers exceeds a second predetermined threshold; or the state comprises a quality of service, and the condition is fulfilled if the quality of service is not provided.

15. The method according to claim 13, wherein the enabling comprises triggering the second network element to start operation.

16. The method according to claim 13, wherein the enabling comprises setting the user equipment such that the user equipment attaches to the second network element rather than to the first network element.

17. The method according to claim 13, further comprising disabling, if the state does not fulfill the condition, that the user equipment attaches to the second network element.

18. The method according to claim 17, wherein the disabling comprises triggering the second network element to stop operation.

* * * * *